United States Patent
Kwon et al.

(10) Patent No.: US 10,550,207 B2
(45) Date of Patent: Feb. 4, 2020

(54) METHOD FOR PREPARING SUPPORTED HYBRID METALLOCENE CATALYST, AND SUPPORTED HYBRID METALLOCENE CATALYST USING THE SAME

(71) Applicant: LG Chem, Ltd., Seoul (KR)

(72) Inventors: Heon Yong Kwon, Daejeon (KR); Eun Young Shin, Daejeon (KR); Hyun Jee Kwon, Daejeon (KR); Ki Soo Lee, Daejeon (KR); Dae Sik Hong, Daejeon (KR); Se Young Kim, Daejeon (KR); Sung Min Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/760,073

(22) PCT Filed: Nov. 24, 2016

(86) PCT No.: PCT/KR2016/013651
§ 371 (c)(1),
(2) Date: Mar. 14, 2018

(87) PCT Pub. No.: WO2017/095079
PCT Pub. Date: Jun. 8, 2017

(65) Prior Publication Data
US 2018/0251580 A1 Sep. 6, 2018

(30) Foreign Application Priority Data

Dec. 4, 2015 (KR) .................. 10-2015-0172424
Dec. 4, 2015 (KR) .................. 10-2015-0172426

(51) Int. Cl.
| | | |
|---|---|---|
| C08F 4/6592 | (2006.01) | |
| C08F 4/653 | (2006.01) | |
| C08F 210/16 | (2006.01) | |
| C08F 10/02 | (2006.01) | |
| C08F 4/659 | (2006.01) | |

(52) U.S. Cl.
CPC .......... *C08F 10/02* (2013.01); *C08F 4/65904* (2013.01); *C08F 4/65927* (2013.01); *C08F 210/16* (2013.01)

(58) Field of Classification Search
CPC ............. C08F 4/65927; C08F 4/65912; C08F 4/65916; C08F 210/16
See application file for complete search history.

(56) References Cited

U.S. PATENT DOCUMENTS

| | | |
|---|---|---|
| 4,871,705 A | 10/1989 | Hoel |
| 5,032,562 A | 7/1991 | Lo et al. |
| 5,525,678 A | 6/1996 | Mink et al. |
| 5,914,289 A | 6/1999 | Razavi |
| 6,069,109 A | 5/2000 | Kao et al. |
| 6,984,703 B1 | 1/2006 | Biagini et al. |
| 2003/0149202 A1 | 8/2003 | Kao et al. |
| 2003/0166457 A1 | 9/2003 | Peterson et al. |
| 2005/0131169 A1 | 6/2005 | Kao |
| 2005/0239636 A1 | 10/2005 | Gao et al. |
| 2018/0265605 A1 | 9/2018 | Shin et al. |

FOREIGN PATENT DOCUMENTS

| | | |
|---|---|---|
| CN | 1409718 A | 4/2003 |
| CN | 106795229 A | 5/2017 |
| EP | 0347128 B1 | 6/1994 |
| EP | 3184556 A1 | 6/2017 |
| JP | 2002293789 A | 10/2002 |
| JP | 2004511634 A | 4/2004 |
| JP | 2004514033 A | 5/2004 |
| JP | 2004515576 A | 5/2004 |
| JP | 3921601 B2 | 5/2007 |
| JP | 4034108 B2 | 1/2008 |
| JP | 4959920 B2 | 6/2012 |
| KR | 19900000392 | 1/1990 |
| KR | 20040076965 A | 9/2004 |
| KR | 20150058054 A | 5/2015 |
| KR | 20150066484 A | 6/2015 |
| KR | 101760494 B1 | 7/2017 |
| WO | 04/076502 A1 | 9/2004 |
| WO | 2006101595 A1 | 9/2006 |

OTHER PUBLICATIONS

Kaminsky, W. et al., "Asymmetric Oligomerization of Propene and 1-Butene with a Zirconocene/Alumoxane Catalyst", Angewandte Chemie International Edition in English, Sep. 1989, vol. 101, No. 9, pp. 1304-1306.

LoCoco, Matthew et al., "Chelate-Controlled Synthesis of Racemic ansa-Zirconocenes", Journal of the American Chemical Society, Nov. 2, 2004, vol. 126, No. 46, pp. 15231-15244.

Song, W. et al., "Error formation in ansa-zirconocene catalyzed isotactic propylene polymerization", Journal of Organometallic Chemistry, Apr. 19, 1996, vol. 512, Nos. 1-2, pp. 131-140.

Kaminsky, W. et al., "Asymmetric Oligomerization of Propene and 1-Butene with a Zirconocenel Alumoxane Catalyst", Angewandte Chemie International Edition in English, Sep. 1989, vol. 28, No. 9, pp. 1216-1218.

Lee, B. Y. et al., "Preparation of Anchored Metallocene Complexes on Dehydroxylated Silica and Their Use in the Polymerization of Ethylene", Macromolecules, 2000, vol. 33, pp. 3194-3195.

(Continued)

*Primary Examiner* — Caixia Lu
(74) *Attorney, Agent, or Firm* — Lerner, David, Littenberg, Krumholz & Mentlik, LLP

(57) ABSTRACT

The present disclosure provides a method for preparing a supported hybrid metallocene catalyst which can be used to prepare a polyolefin, a supported hybrid metallocene catalyst prepared by using the method, and a method for preparing a polyolefin using the supported hybrid metallocene catalyst.

13 Claims, No Drawings

(56) References Cited

OTHER PUBLICATIONS

Wahner, U. et al., "Oligomerisation of 1-pentene with metallocene catalysts", Die Angewandte Makromolekulare Chemie, Apr. 6, 1999, vol. 270, pp. 49-55.
International Search Report for PCT/KR2016/013651 dated Feb. 27, 2017.
Chinese Search Report for Application No. 201680054968.X dated Oct. 9, 2019, pp. 1-3.
Kaminsky, et al., Asymmetric Oligomerization of Propene and 1-Butene with a Zirconocene/Alumoxane Catalyst, Angew. Chem. Int. Ed. Engl., 1989, pp. 1216-1218, vol. 28, No. 9.

METHOD FOR PREPARING SUPPORTED HYBRID METALLOCENE CATALYST, AND SUPPORTED HYBRID METALLOCENE CATALYST USING THE SAME

CROSS-REFERENCE TO RELATED APPLICATIONS

This application is a national phase entry under 35 U.S.C. § 371 of International Application No. PCT/KR2016/013651, filed Nov. 24, 2016, which claims priority to Korean Patent Application Nos. 10-2015-0172424 and 10-2015-0172426, both filed Dec. 4, 2015, the disclosures of which are incorporated herein by reference.

BACKGROUND OF THE INVENTION

(a) Field of the Invention

The present disclosure relates to a method for preparing a supported hybrid metallocene catalyst which can be used to prepare a polyolefin, a supported hybrid metallocene catalyst prepared by using the method, and a method for preparing a polyolefin using the supported hybrid metallocene catalyst.

(b) Description of the Related Art

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method for preparing a polymerization catalyst by supporting two different transition metal catalysts on one support. This catalyst is prepared by supporting a titanium (Ti)-based Ziegler-Natta catalyst which produces a high molecular weight polymer and a zirconium (Zr)-based metallocene catalyst which produces a low molecular weight polymer on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method for using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method for controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts are departed from a supported component of the resulting catalyst to cause fouling in the reactor.

Therefore, to solve the above drawbacks, there is a continuous demand for a method for preparing polyolefins with desired physical properties by easily preparing a supported metallocene catalyst having an excellent activity.

PRIOR ART LITERATURE

Patent Literature (PATENT LITERATURE 1) U.S. Pat. No. 5,032,562
(PATENT LITERATURE 2) U.S. Pat. No. 5,525,678
(PATENT LITERATURE 3) U.S. Pat. No. 5,914,289
(PATENT LITERATURE 4) Korean Patent Application No. 2003-12308

SUMMARY OF THE INVENTION

The present disclosure is to provide a method for preparing a supported hybrid metallocene catalyst which can be used to prepare a polyolefin.

In addition, the present disclosure is to provide a supported hybrid metallocene catalyst prepared by using the method.

In addition, the present disclosure is to provide a method for preparing a polyolefin using the supported hybrid metallocene catalyst.

The present disclosure provides a method for preparing a supported hybrid metallocene catalyst, including the steps of:

supporting at least one first metallocene compound represented by the following Chemical Formula 1 or 2 on a support; and supporting a cocatalyst on the support on which the first metallocene compound is supported.

In addition, the present disclosure provides a supported hybrid metallocene catalyst prepared by using the method.

In addition, the present disclosure provides a method for preparing a polyolefin including the step of polymerizing olefinic monomers in the presence of the supported hybrid metallocene catalyst.

Hereinafter, the method for preparing a supported hybrid metallocene catalyst, the supported hybrid metallocene catalyst prepared by using the same, and the method for preparing a polyolefin using the supported hybrid metallocene catalyst according to the exemplary embodiments of the present disclosure will be described in more detail.

According to an embodiment of the present disclosure, a method for preparing a supported hybrid metallocene catalyst is provided, the method including the steps of:

supporting at least one first metallocene compound represented by the following Chemical Formula 1 or 2 on a support; and supporting a cocatalyst on the support on which the first metallocene compound is supported.

[Chemical Formula 1]

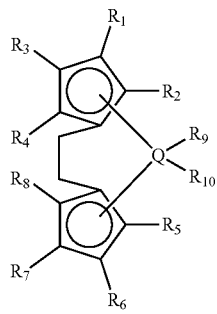

in Chemical Formula 1, $R_1$, $R_2$, $R_5$, and $R_6$ are the same as or different from each other, and are each independently hydrogen or a C1 to C20 alkyl group, $R_3$, $R_4$, $R_7$, and $R_8$ are the same as or different from each other, and are each independently hydrogen or a C1 to C20 alkyl group, or two or more neighboring groups of $R_3$, $R_4$ and $R_7$, $R_8$ may be connected with each other to form a substituted or unsubstituted aliphatic or aromatic ring, Q is a Group 4 transition metal, and $R_9$ and $R_{10}$ are pivalate,

[Chemical Formula 2]

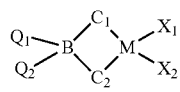

in Chemical Formula 2,

M is a Group 4 transition metal,

B is carbon, silicon, or germanium, $Q_1$ and $Q_2$ are the same as or different from each other, and are each independently hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group, $X_1$ and $X_2$ are pivalate, and $C_1$ and $C_2$ are the same as or different from each other, and are each independently represented by one of the following Chemical Formula 3a, Chemical Formula 3b, Chemical Formula 3c, or Chemical Formula 3d, provided that at least one of $C_1$ and $C_2$ is represented by Chemical Formula 3a,

[Chemical Formula 3a]

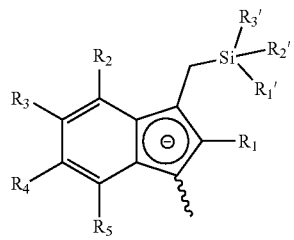

[Chemical Formula 3b]

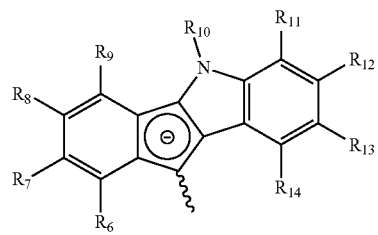

[Chemical Formula 3c]

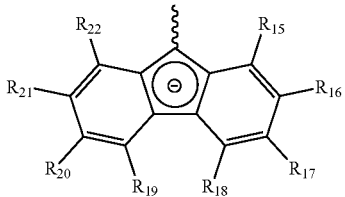

[Chemical Formula 3d]

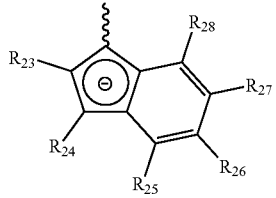

in Chemical Formulae 3a, 3b, 3c, and 3d, $R_1$ to $R_{28}$ are the same as or different from each other, and are each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 ether group, a C1 to C20 silylether group, a C1 to C20 alkoxy group, a C6 to C20 aryl group, a C7 to C20 alkylaryl group, or a C7 to C20 arylalkyl group, $R'_1$ to $R'_3$ are the same as or different from each other, and are each independently hydrogen, halogen, a C1 to C20 alkyl group, a C2 to C20 alkenyl group, or a C6 to C20 aryl group, and two or more neighboring groups of $R_1$ to $R_{28}$ may be connected with each other to form a substituted or unsubstituted aliphatic or aromatic ring.

In the method for preparing a supported hybrid metallocene catalyst of the embodiment, at least one first metallocene compound represented by the Chemical Formula 1 or 2 and pivalate groups are introduced to the transition metal is supported on a support before a cocatalyst is supported on the support. Herein, one or more kinds of the first metallocene compounds represented by the Chemical Formula 1 or 2 may be supported on the support. When two or more kinds of them are supported, two kinds of metallocene compounds may be mixed and then reacted with the support at the same time to be supported. Or, one metallocene compound may be supported on the support, and the other metallocene compound may be supported on the support sequentially.

Subsequently, a cocatalyst is supported on the support on which the first metallocene compound is supported. When the catalyst is prepared by first supporting at least one first metallocene compound represented by the following Chemical Formula 1 or 2 in which pivalate is introduced thereto on the support, and then supporting the cocatalyst in sequence, the interaction between the introduced pivalate and the support improves the supporting efficiency, thereby improving the activity of the supported hybrid metallocene catalyst and producing a polyolefin having improved bulk density.

In addition, after supporting the cocatalyst on the support on which the first metallocene compound is supported, a second metallocene compound may be supported on the support on which the cocatalyst is supported, wherein the second metallocene compound is represented by the Chemical Formula 1 or 2, but $R_9$, $R_{10}$, $X_1$ and $X_2$ are each independently pivalate, halogen, or a C1 to C20 alkyl group.

The first metallocene compound and the second metallocene compound represented by the Chemical Formula 1 or 2 will be described in more detail.

In the present disclosure, the terms "the first", "the second", and the like are used to describe a variety of components, and these terms are merely employed to distinguish a certain component from other components.

The first metallocene compound and the second metallocene compound are the same in that they are compounds represented by the Chemical Formula 1 or 2, but there is a difference between the substituents connected to the transition metal of the Chemical Formula 1 or 2. More specifically, in the first metallocene compound, $R_9$ and $R_{10}$ in the Chemical Formula 1 are pivalate, and $X_1$ and $X_2$ in the Chemical Formula 2 are pivalate. However, in the second metallocene compound, $R_9$ and $R_{10}$ in the Chemical Formula 1, and $X_1$ and $X_2$ in the Chemical Formula 2 are each independently pivalate, halogen, or a C1 to C20 alkyl group.

That is, in the method for preparing a supported hybrid metallocene catalyst of the embodiment, at least one first metallocene compound represented by the Chemical Formula 1 or 2 having pivalate groups is supported on the support, and then a cocatalyst is supported on the support, followed by supporting the second metallocene compound, if necessary. When the catalyst is prepared in this order, the loading efficiency is increased, and thereby the activity of the supported hybrid metallocene catalyst and the bulk density are improved, so that the productivity can be improved. Further, as the MFRR value which is an index of processability can be finely adjusted to a desired level, the processability and physical properties of the produced polyolefin can be easily controlled.

The substituents of Chemical Formula 1 and Chemical Formula 2 are more specifically explained as follows.

The C1 to C20 alkyl group may include a linear or branched alkyl group, and specifically, it may be a methyl group, an ethyl group, a propyl group, an isopropyl group, an n-butyl group, a tert-butyl group, a pentyl group, a hexyl group, a heptyl group, an octyl group, or the like, but is not limited thereto.

The Group 4 transition metal may be titanium (Ti), zirconium (Zr), hafnium (Hf), or the like, but is not limited thereto.

The C2 to C20 alkenyl group may include a linear or branched alkenyl group, and specifically, it may be an allyl group, an ethenyl group, a propenyl group, a butenyl group, a pentenyl group, or the like, but is not limited thereto.

The C6 to C20 aryl group may include a single ring aryl group or a condensed ring aryl group, and specifically, it may be a phenyl group, a biphenyl group, a naphthyl group, a phenanthrenyl group, a fluorenyl group, or the like, but is not limited thereto.

The C5 to C20 heteroaryl group may include a single ring heteroaryl group or a condensed ring heteroaryl group, and specifically, it may be a carbazolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group, or the like, but is not limited thereto.

The C1 to C20 alkoxy group may be a methoxy group, an ethoxy group, a phenyloxy group, a cyclohexyloxy group, a tert-butoxyhexyl group, or the like, but is not limited thereto.

The C1 to C20 alkylsilyl group may be a methylsilyl group, a dimethylsilyl group, a trimethylsilyl group, or the like, but is not limited thereto.

The C1 to C20 silylalkyl group may be a silylmethyl group, a dimethylsilylmethyl group(-$CH_2$—Si($CH_3$)$_2$H), a trimethylsilylmethyl group(-$CH_2$—Si($CH_3$)$_3$), or the like, but is not limited thereto.

In the first and second metallocene compound represented by the Chemical Formula 1 or 2, it is preferable that $R_1$, $R_2$ and $R_5$, $R_6$ of Chemical Formula 1 are each independently hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group, but is not limited thereto.

Also, $R_3$, $R_4$ and $R_7$, $R_8$ of Chemical Formula 1 may be each independently hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group. Or, $R_3$, $R_4$ and $R_7$, $R_8$ may be connected with each other to form a phenyl group, a cyclohexyl group, or the like. However, $R_3$, $R_4$ and $R_7$, $R_8$ are not limited thereto.

Meanwhile, the present disclosure can produce a highly active polyolefin as well as maintain excellent copolymerization ability by using the Chemical Formula 3a having a specific substituent in at least one of $C_1$ and $C_2$ of the Chemical Formula 2.

It is preferable that $R_1$ to $R_{28}$ of Chemical Formula 3a, 3b, 3c, and 3d are each independently hydrogen, halogen, a methyl group, an ethyl group, a propyl group, an isopropyl group, an n-butyl group, a tert-butyl group, a pentyl group, a hexyl group, a heptyl group, an octyl group, an ethylene group, a propylene group, a butylene group, a phenyl group, a benzyl group, a naphthyl group, a halogen group, an ether group, a trimethylsilyl group, a triethylsilyl group, a tripropylsilyl group, a tributylsilyl group, a triisopropylsilyl group, a trimethylsilylmethyl group, a dimethyl ether group, tert-butyldimethylsilyl ether group, a methoxy group, an ethoxy group, or a tert-butoxyhexyl group, but is not limited thereto.

It is preferable that $Q_1$ and $Q_2$ of Chemical Formula 2 is hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group, but is not limited thereto.

In addition, B of Chemical Formula 2 is preferably silicon, but is not limited thereto.

Specifically, the metallocene compound of the Chemical Formula 2 is characterized in that the substituent of the Chemical Formula 3a includes a C1 to C20 silylalkyl group such as trimethylsilyl methyl.

More specifically, an indene derivative of Chemical Formula 3a has relatively low electron density compared to an indenoindole derivative or a fluorenyl derivative, and includes a silylalkyl group with large steric hindrance. Therefore, due to steric hindrance effects and electron density factors, the metallocene compound may polymerize an olefin polymer having a relatively low molecular weight with high activity, compared to a metallocene compound having a similar structure.

Moreover, the indenoindole derivative which may be represented by Chemical Formula 3b, the fluorenyl derivative which may be represented by Chemical Formula 3c, and the indene derivative which may be represented by Chemical Formula 3d form a structure which is crosslinked by a bridge and have an unshared electron pair which can act as a Lewis base with respect to the structure of the ligand, thereby exhibiting high polymerization activity.

According to an embodiment of the present disclosure, a specific example of the functional group represented by Chemical Formula 3a may be a compound represented by any one of the following structural formulae, but is not limited thereto.

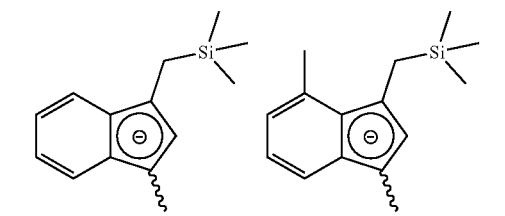

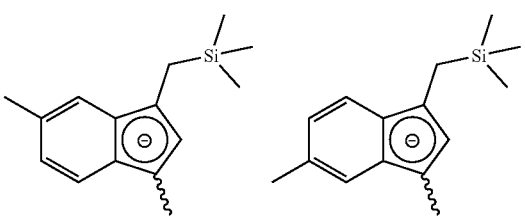

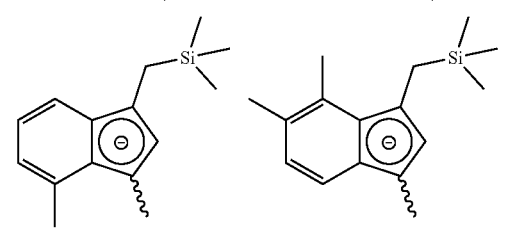

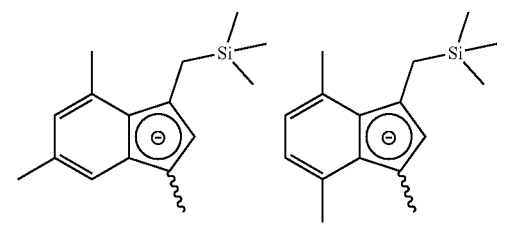

-continued

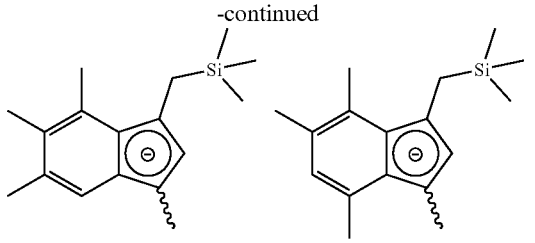

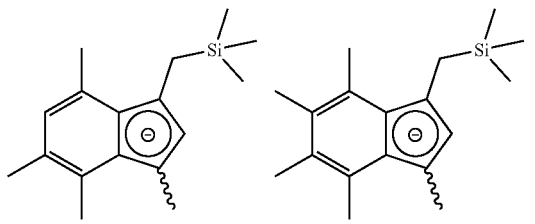

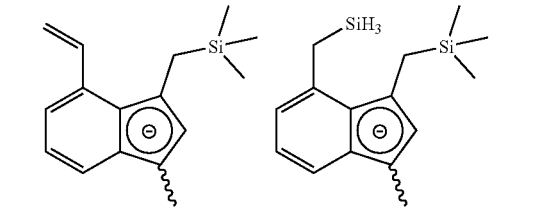

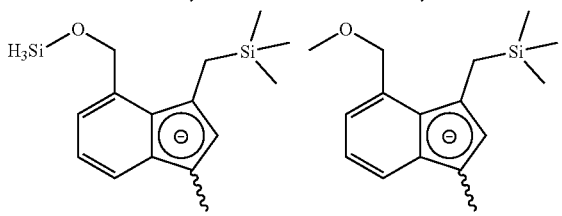

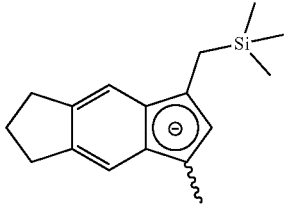

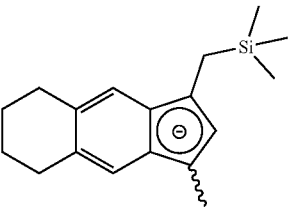

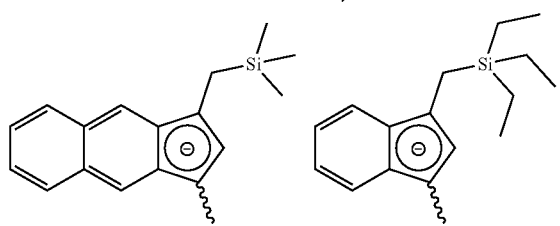

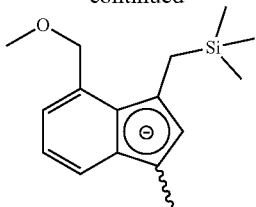
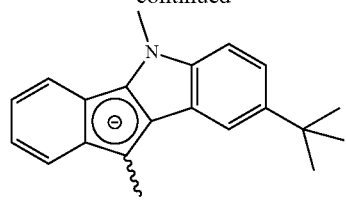
In addition, a specific example of the functional group represented by Chemical Formula 3b may be a compound represented by any one of the following structural formulae, but is not limited thereto.
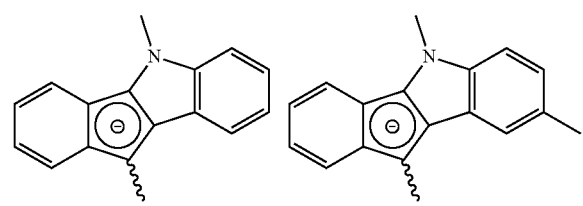
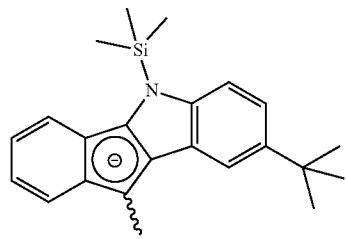
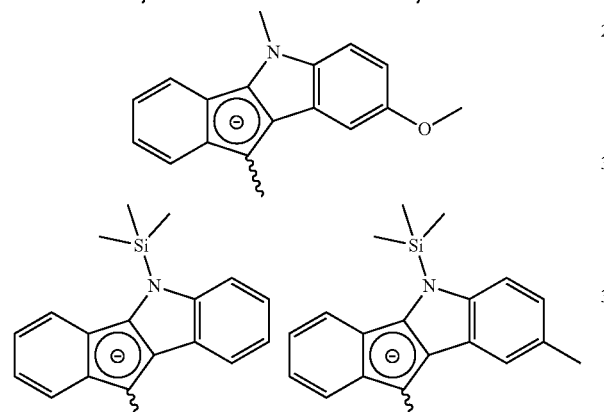
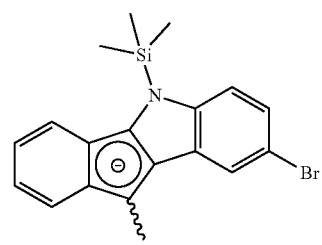
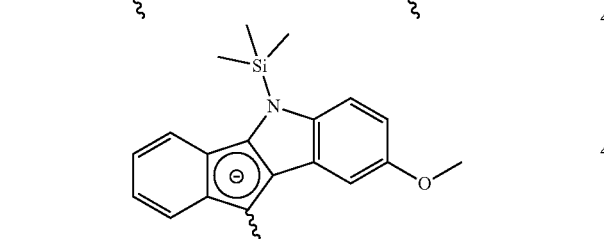
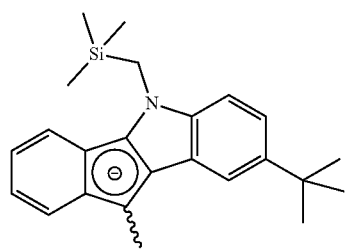
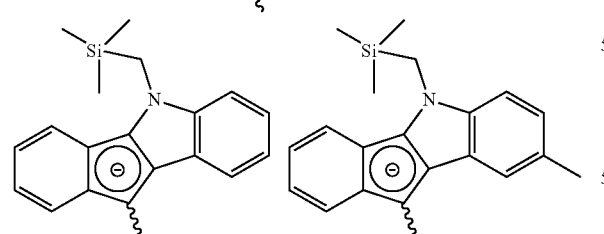
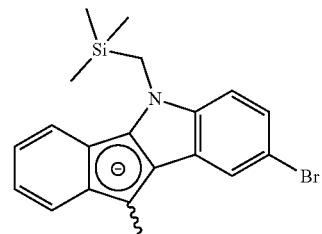
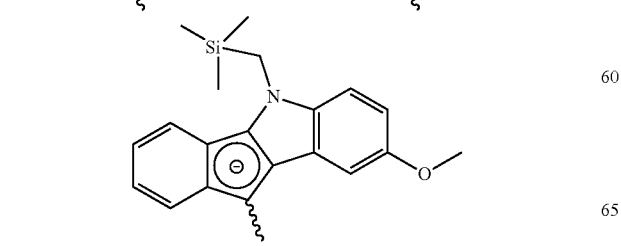
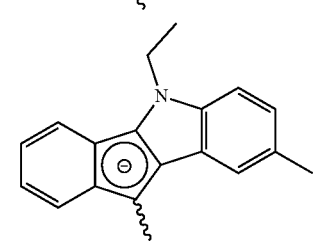

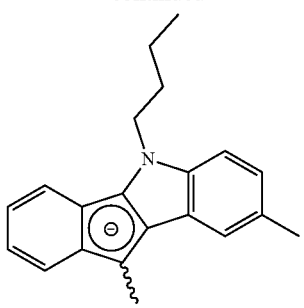
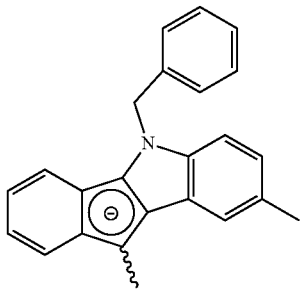

A specific example of the functional group represented by Chemical Formula 3c may be a compound represented by any one of the following structural formulae, but is not limited thereto.

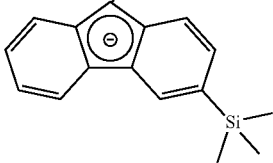
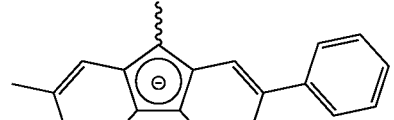
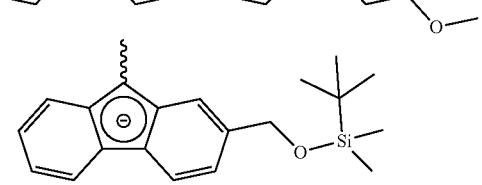
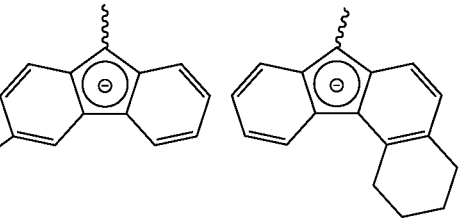
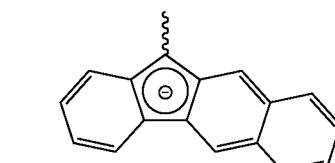
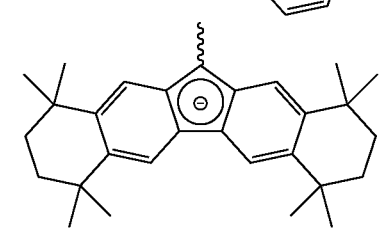
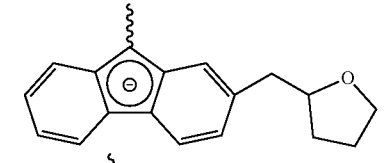
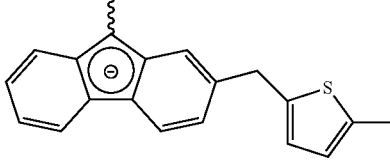

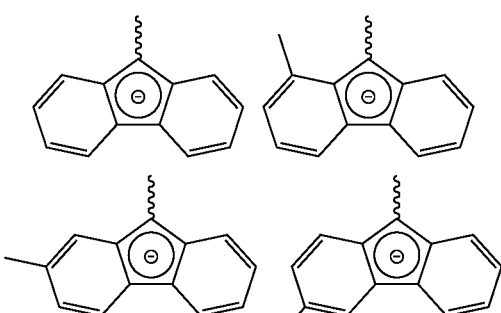
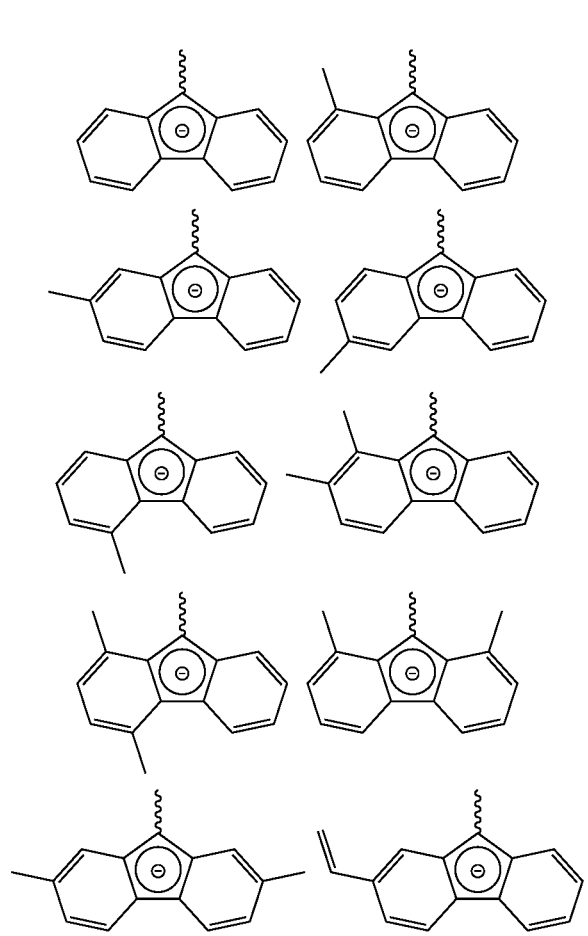

In addition, a specific example of the functional group represented by Chemical Formula 3d may be a compound represented by any one of the following structural formulae, but is not limited thereto.

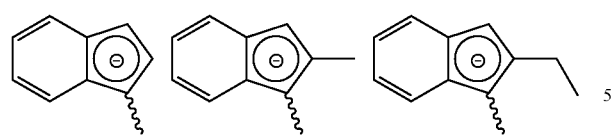
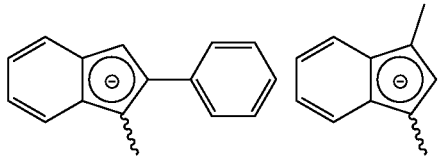
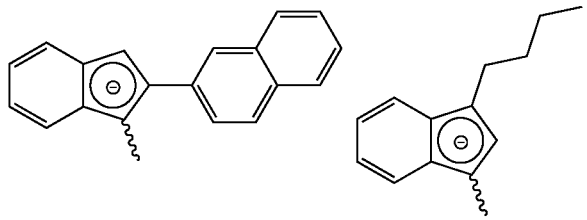
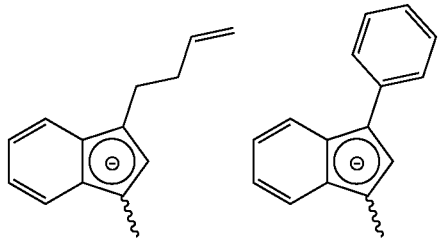
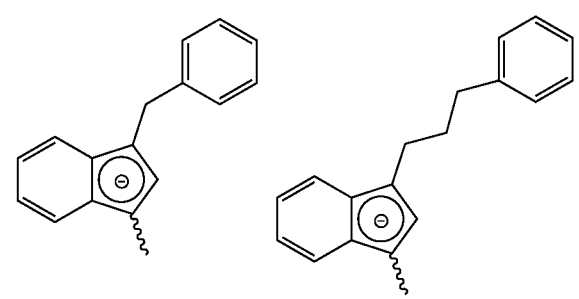
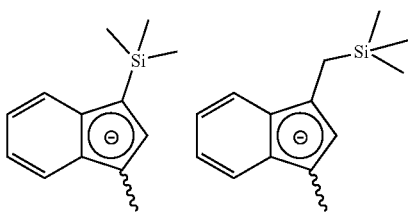
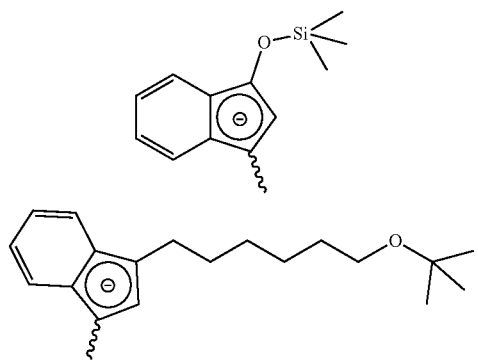
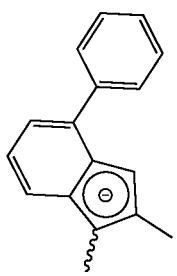
In addition, the first metallocene compound may be selected from the group consisting of the following structural formulae:
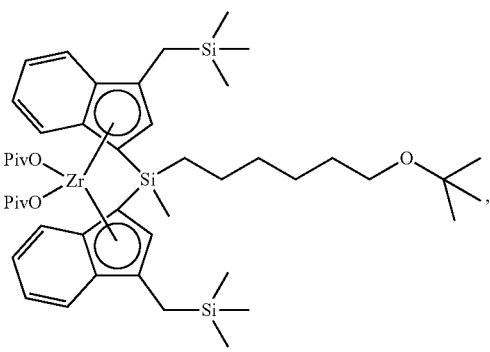
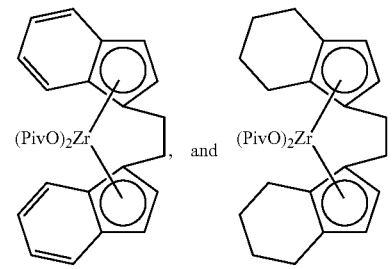
Also, the second metallocene compound may be selected from the group consisting of the following structural formulae:
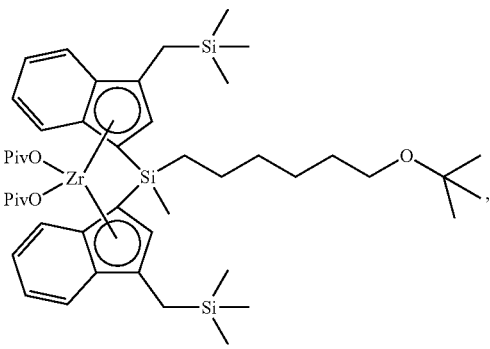

-continued

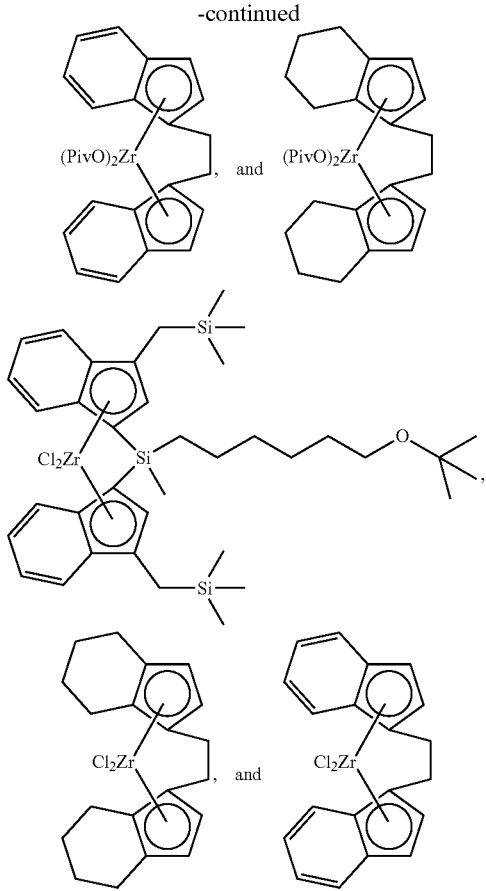

In addition, the first and second metallocene compound may be supported at a weight ratio of 1:99 to 99:1, preferably 5:95 to 5:95 on the support. It is preferable that the first and second metallocene compounds are supported on the support at the ratio described above, because all the characteristics of the first and second metallocene compounds can be expressed. Further, the cocatalyst used in the method for preparing a supported hybrid metallocene catalyst of the embodiment may include one or more of compounds represented by the following Chemical Formula 4, Chemical Formula 5, and Chemical Formula 6:

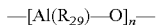 [Chemical Formula 4]

in Chemical Formula 4, $R_{29}$ are the same as or different from each other, and each independently halogen; C1 to C20 hydrocarbon; or halogen-substituted C1 to C20 hydrocarbon; and n is an integer of 2 or more;

 [Chemical Formula 5]

in Chemical Formula 5, $R_{30}$ are the same as defined in Chemical Formula 4; and J is aluminum or boron;

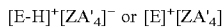 [Chemical Formula 6]

in Chemical Formula 6,

E is a neutral or cationic Lewis acid;

H is a hydrogen atom;

Z is a Group 13 element; and

A' are the same as or different from each other, and each independently a C6 to C20 aryl group or a C1 to C20 alkyl group, of which one or more hydrogen atoms are substituted or unsubstituted with halogen, C1 to C20 hydrocarbon, alkoxy, or phenoxy.

Examples of the compound represented by Chemical Formula 4 may include methylaluminoxane(MAO), ethylaluminoxane, isobutylaluminoxane, butylaluminoxane, and the like, and a more preferred compound is methylaluminoxane.

Examples of the compound represented by Chemical Formula 5 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and a more preferred compound is selected from trimethylaluminum, triethylaluminum, and triisobutylaluminum.

Examples of the compound represented by Chemical Formula 6 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like.

Moreover, as long as the support used in the method for preparing a supported hybrid metallocene catalyst of the embodiment is a metal, a metal salt, or a metal oxide which is commonly used in supported catalysts, there is no limitation in the constitution thereof. Specifically, the support may include any support selected from the group consisting of silica, silica-alumina, and silica-magnesia. Generally, the support may include an oxide, a carbonate, a sulfate, or a nitrate of a metal, such as $Na_2O$, $K_2CO_3$, $BaSO_4$, $Mg(NO_3)_2$, and the like.

In addition, the support is preferably used in a sufficiently dried state before the metallocene compound, cocatalyst, and the like are supported. The drying temperature is preferably 200 to 1000° C., and more preferably 400 to 800° C. If the drying temperature of the support is less than 400° C., the moisture is too much, so that the moisture can react with the cocatalyst. If the temperature exceeds 800° C., the pores on the surface of the support are combined to reduce the surface area, and the hydroxyl groups on the surface are largely removed, thereby only the siloxane groups are remained, which reduces the reaction site with the cocatalyst.

In addition, the first and second metallocene compound may be each supported in an amount of about 0.1 to about 20 parts by weight, preferably about 1 to about 15 parts by weight, based on 100 parts by weight of the support.

Further, the cocatalyst may be supported in an amount of about 1 to about 1,000 parts by weight, preferably about 10 to about 500 parts by weight, based on 100 parts by weight of the support.

The steps of supporting the first metallocene compound represented by the following Chemical Formula 1 or 2 on a support; and supporting the cocatalyst on the support on which the first metallocene compound is supported; may be carried out at a temperature of about −30 to 150° C., preferably about 0 to 100° C.

According to another embodiment of the present disclosure, a supported hybrid metallocene catalyst prepared by using the above-mentioned method is provided.

Moreover, according to another embodiment of the present disclosure, a method for preparing a polyolefin including the step of polymerizing olefinic monomers in the presence of the supported hybrid metallocene catalyst by using the method is provided.

In the method for preparing a polyolefin, a polyolefin having improved bulk density by improving the morphology of the produced powder, and desired processability and physical properties can be prepared, by using the method including the steps of preparing the supported hybrid metallocene catalyst according to the embodiment; and polymerizing olefinic monomers in the presence of the supported hybrid metallocene catalyst.

The supported hybrid metallocene catalyst in the method for preparing a polyolefin may be used as it is in the polymerization of olefinic monomers. Also, the catalyst may be prepared and used as a pre-polymerized catalyst by contacting the catalyst with an olefinic monomer. For example, it may be prepared and used as a pre-polymerized catalyst by contacting the catalyst with an olefinic monomer such as ethylene, propylene, 1-butene, 1-hexene, 1-octene, or the like.

Specific examples of the olefinic monomer which can be polymerized using the supported hybrid metallocene catalyst may include ethylene, alpha-olefin, cyclic olefin, and diene or triene olefin having at least two double bonds. More specifically, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, or the like, and these monomers may be copolymerized by mixing two or more thereof.

In the step of polymerizing olefinic monomers in the presence of the supported hybrid metallocene catalyst, it is preferable that the polymerization of the olefinic monomer is carried out at a temperature of 50 to 150° C.

The polymerization of the olefinic monomers may be carried out in a slurry process, a gas phase process, or a combination of slurry and gas phase processes. A slurry process or a gas phase process is preferable.

In the method for preparing a polyolefin, the supported hybrid metallocene catalyst can be injected after being dissolved or diluted using an aliphatic hydrocarbon solvent having 5 to 12 carbon atoms such as pentane, hexane, heptane, nonane, decane and isomers thereof; an aromatic hydrocarbon solvent such as toluene and benzene; or a hydrocarbon solvent substituted with a chlorine atom such as dichloromethane and chlorobenzene. Preferably, the solvent is treated with a trace amount of alkyl aluminum to remove catalytic poisons like water, air or the like, and a cocatalyst can be further used.

According to the present disclosure, a method for preparing a supported hybrid metallocene catalyst which not only exhibits high activity in the olefin polymerization reaction, but also can easily control the properties such as the internal structure and mechanical properties of the olefin polymer to be produced, the supported hybrid metallocene catalyst prepared by using the same, and the method for preparing a polyolefin using the supported hybrid metallocene catalyst are provided.

DETAILED DESCRIPTION OF THE EMBODIMENTS

The present invention will be described in more detail with reference to the following examples. However, these examples are for illustrative purposes only, and the invention is not intended to be limited by these examples.

PREPARATION EXAMPLE OF METALLOCENE COMPOUND

Preparation Example 1: Precursor A

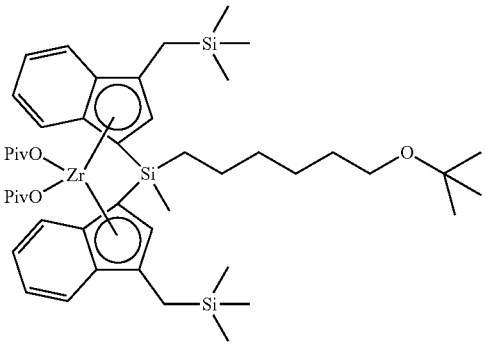

1-1 Synthesis of Ligand Compound 4.05 g (20 mmol) of ((1H-inden-3-yl)methyl)trimethylsilane was placed into a dried 250 mL Schlenk flask and dissolved in 40 mL of diethylether under argon gas. After cooling the solution to 0° C., 1.2 equivalent weights (9.6 mL, 24 mmol) of 2.5 M n-BuLi (hexane solution) dissolved in hexane was slowly added dropwise. The reaction mixture was slowly warmed to room temperature and stirred for 24 hours. A solution of 2.713 g (10 mmol) of silicone tether in 30 ml of hexane was prepared in another 250 ml Schlenk flask, cooled down to −78° C., and the above prepared mixture was slowly added dropwise thereto. After the dropwise addition, the mixture was slowly warmed to room temperature and stirred for 24 hours. 50 mL of water was added thereto, and the organic layer was extracted three times with 50 mL of ether. An appropriate amount of MgSO$_4$ was added to the extracted organic layer and stirred for a while. And then, it was filtered and the solvent was dried under reduced pressure to obtain 6.1 g (molecular weight: 603.11, 10.05 mmol, yield: 100.5%) of a yellow oil-type ligand compound. The obtained ligand compound was used for the synthesis of the metallocene compound without a separation process.

$^1$H NMR (500 MHz, CDCl$_3$): 0.02 (18H, m), 0.82 (3H, m), 1.15 (3H, m), 1.17 (9H, m), 1.42 (H, m), 1.96 (2H, m), 2.02 (2H, m), 3.21 (2H, m), 3.31 (1H, s), 5.86 (1H, m), 6.10 (1H, m), 7.14 (3H, m), 7.14 (2H, m) 7.32 (3H, m).

1-2 Synthesis of Metallocene Compound Precursor

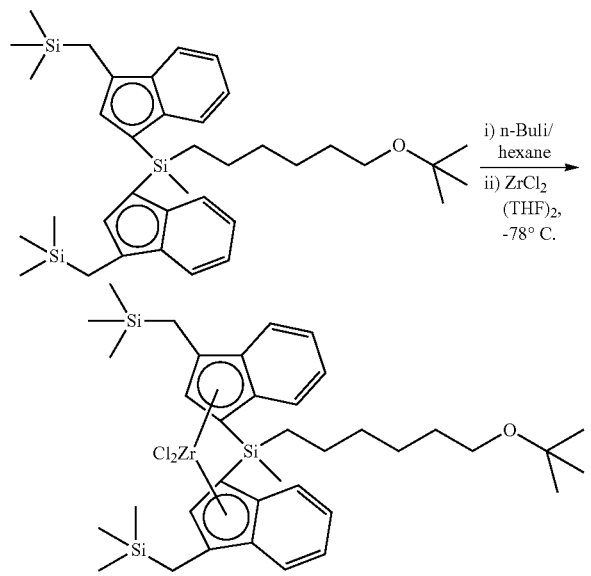

The ligand compound synthesized in 1-1 was added to a 250 mL Schlenk flask dried in an oven, and then dissolved in 4 equivalent weights of methyl tert-butyl ether and 60 mL of toluene, to which 2 equivalent weights of n-BuLi hexane solution was added for lithiation. After one day, all solvent in the flask was removed under a vacuum condition, and the resultant was dissolved in an equal amount of toluene. In a glove box, one equivalent weight of ZrCl$_4$(THF)$_2$ was added in a 250 mL Schlenk flask, and then toluene was injected into the flask to prepare a suspension. The above two flasks were cooled down to −78° C., and then the lithiated ligand compound was slowly added to the toluene suspension of ZrCl$_4$(THF)$_2$. After completion of the injection, the reaction mixture was slowly warmed up to room temperature, stirred for one day and allowed to react. Then, toluene in the mixture was removed to a volume of about ⅕ through vacuum/reduced pressure. Hexane of about 5 times the volume of the remaining toluene was added thereto and the mixture was recrystallized. The resultant was filtered without contacting with the outside air to obtain a metallocene compound. The resulting filter cake in the upper portion of the filter was washed using a small amount of hexane, and then weighed in the glove box to identify the synthesis, yield, and purity.

7.3 g (9.56 mmol, 95.6%) of a purple oil was obtained from 6.1 g (10 mmol) of the ligand compound, and was stored in a toluene solution (purity: 100%, molecular weight: 763.23).

$^1$H NMR (500 MHz, CDCl$_3$): 0.03 (18H, m), 0.98, 1.28 (3H, d), 1.40 (9H, m), 1.45 (4H, m), 1.66 (6H, m), 2.43 (4H, s), 3.47 (2H, m), 5.34 (1H, m), 5.56 (1H, m), 6.95 (1H, m), 6.97 (1H, m), 6.98 (1H, m), 7.22 (1H, m), 7.36 (2H, m), 7.43 (1H, m), 7.57 (1H, m)

1-3 Synthesis of Metallocene Compound

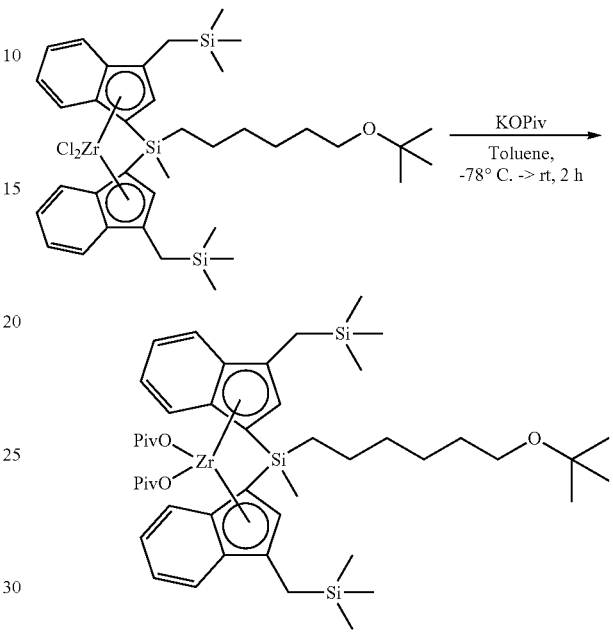

1.52 g (2 mmol) of the metallocene compound precursor prepared in 1-2 was added to a 250 mL Schlenk flask dried in an oven, and then diluted with 40 mL of dry toluene. This solution was cooled down to −78° C., and then 840 mg (6 mmol, 3 equivalent weights) of potassium pivalate was added thereto under an argon atmosphere. When this reaction mixture was gradually warmed up to room temperature, the color of the solution changed from red to yellow as the reaction proceeded. This reaction mixture was further stirred for about 2 hours, and then passed through a celite pad under an argon atmosphere to remove the residual potassium pivalate and inorganic materials. A solvent was removed from a filtrate under reduced pressure to obtain a light yellow compound with a yield of 80%.

$^1$H NMR (500 MHz, CDCl$_3$): 0.05-0.24 (18H, m), 0.89-0.92 (3H, m), 1.28-1.43 (31H, m), 1.50-1.62 (4H, m), 2.17-2.23 (2H, m), 2.46 (4H, s), 3.34 (2H, m), 6.32 (2H, m), 6.67 (2H, m), 7.14-7.38 (8H, m)

Preparation Example 2: Precursor B

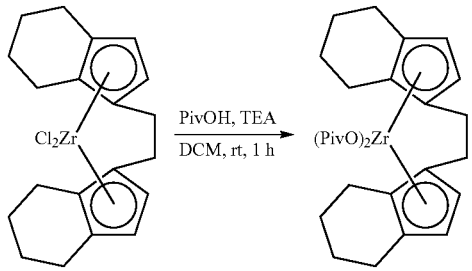

As a metallocene compound precursor, Dichloro[rac-ethylenebis(4,5,6,7-tetrahydro-1-indenyl)]zirconium(IV) was procured (purchased from Sigma-Aldrich, Cas Number 100163-29-9). 2.13 g (5 mmol) of the metallocene compound precursor was added to a 250 mL Schlenk flask dried in an oven. Under an argon atmosphere, 1.02 g (10 mmol) of pivalic acid was added thereto, and dissolved in 50 mL of dichloromethane. This reaction mixture was cooled down to 0° C., and then 1.4 mL (10 mmol) of triethylamine was slowly injected thereto. A bath was removed, and the reaction mixture was gradually warmed up to room temperature. Within 30 minutes, a yellow color disappeared and it turned to a white color. After about 1 hr, the reaction solvent was completely removed under reduced pressure, and 100 mL of ether was added to completely dissolve a white solid by sonication. The mixture in the flask was filtered under an argon atmosphere to obtain a colorless ether filtrate. This filtrate was completely dried to obtain 2.65 g (yield of about 90%) of a white solid.

$^1$H NMR (500 MHz, CDCl$_3$): 1.19 (18H, s), 1.41-1.58 (4H, m), 1.72-1.79 (2H, m), 1.81-1.88 (2H, m), 2.21-2.25 (2H, m), 2.33-2.39 (2H, m), 2.52-2.60 (2H, m), 2.82-2.88 (2H, m), 3.03-3.16 (4H, m), 5.57 (2H, s), 5.92 (2H, s)

Preparation Example 3: Precursor C

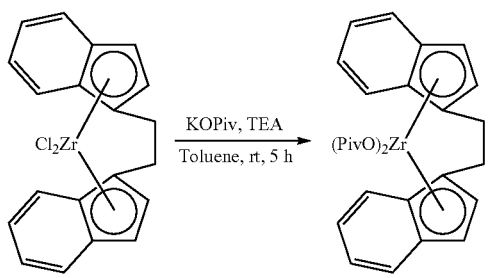

As a metallocene compound precursor, Dichloro[rac-ethylene bis(indenyl)]zirconium(IV) was procured (purchased from Sigma-Aldrich, CAS Number 100080-82-8). 2.05 g (5 mmol) of the metallocene compound precursor was added to a 250 mL Schlenk flask dried in an oven, and then 60 mL of dry toluene was added thereto to prepare a suspension. Under an argon atmosphere, 2.11 g (15 mmol, 3 equivalent weights) of potassium pivalate was thereto, and within about 2 hrs, floating materials disappeared, and the solution turned clear yellow. This reaction mixture was further stirred for about 3 hours, and then passed through a celite pad under an argon atmosphere to remove residual potassium pivalate and inorganic materials. A solvent was removed from a resulting filtrate under reduced pressure and recrystallized with pentane to obtain a light yellow compound with a yield of 50% to 60%.

$^1$H NMR (500 MHz, CDCl$_3$): 0.98-1.22 (18H, m), 3.34 (4H, s), 6.61 (2H, m), 6.83 (2H, m), 7.26-7.35 (4H, m), 7.37-7.41 (2H, m), 7.43-7.48 (1H, m), 7.54-7.58 (1H, m)

Comparative Preparation Example 1: Precursor D

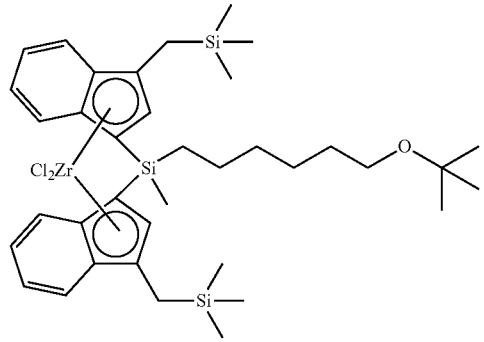

The metallocene compound precursor of the above structural formula synthesized in 1-2 of Preparation Example 1 was used.

Comparative Preparation Example 2: Precursor E

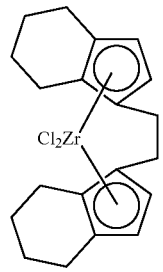

A metallocene compound having the above structural formula, Dichloro [rac-ethylenebis(4,5,6,7-tetrahydro-1-indenyl)]zirconium(IV) was procured (purchased from Sigma-Aldrich, Cas Number 100163-29-9).

Comparative Preparation Example 3: Precursor F

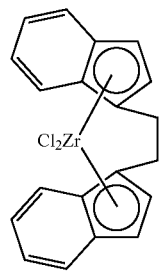

A metallocene compound having the above structural formula, Dichloro[rac-ethylene bis(indenyl)]zirconium(IV) was procured (purchased from Sigma-Aldrich, Cas Number 100080-82-8).

Example of Supported Catalyst

Catalyst Example 1

0.95 g of the catalyst precursor structure A prepared in Preparation Example 1 and 30 mL of toluene were added to a 50 mL Schlenk flask to prepare a precursor solution. 100 mL of toluene was added to a 300 mL high pressure glass reactor, 10 g of silica (Grace Davison, SP952X calcined at 650° C.) was added thereto at 40° C., and stirred for 30 min, and then allowed to stand. The solution prepared in the 50 mL flask was added to a glass reactor, warmed to 60° C., and allowed to react for 6 hrs while stirring. The reactor was cooled down to 40° C., and then stirring was stopped, followed by settling for 10 min and then decantation. After 30 mL of toluene was added to the reactor, 70 g of 10 wt % MAO was added thereto, warmed to 80° C., and allowed to react for 12 hrs while stirring. The reactor was cooled down to room temperature, and then stirring was stopped, followed by settling for 10 min and then decantation. 100 mL of hexane was added into the reactor, the hexane slurry was transferred to a Schlenk flask, and the hexane solution was subjected to decantation. The resultant was dried at room temperature under reduced pressure for 3 hrs.

Catalyst Example 2

A supported catalyst was prepared in the same manner as in Catalyst Example 1, except that 0.76 g of the catalyst precursor structure B was used instead of the catalyst precursor structure A.

Catalyst Example 3

A supported catalyst was prepared in the same manner as in Catalyst Example 1, except that 0.70 g of the catalyst precursor structure C was used instead of the catalyst precursor structure A.

Catalyst Example 4

0.76 g of the catalyst precursor structure A prepared in Preparation Example 1 and 30 mL of toluene were added to a 50 mL Schlenk flask to prepare a precursor solution. 100 mL of toluene was added to a 300 mL high pressure glass reactor, 10 g of silica (Grace Davison, SP952X calcined at 650° C.) was added thereto at 40° C., and stirred for 30 min, and then allowed to stand. The solution prepared in the 50 mL flask was added to a glass reactor, warmed to 80° C., and allowed to react for 6 hrs while stirring. The reactor was cooled down to 40° C., and then stirring was stopped, followed by settling for 10 min and then decantation. After 30 mL of toluene was added to the reactor, 70 g of 10 wt % MAO was added thereto, warmed to 80° C., and allowed to react for 12 hrs while stirring. The reactor was cooled down to room temperature, and then stirring was stopped, followed by settling for 10 min and then decantation. 100 mL of hexane was added into the reactor, the hexane slurry was transferred to a Schlenk flask, and the hexane solution was subjected to decantation. The resultant was dried at room temperature under reduced pressure for 3 hrs.

Catalyst Example 5

A supported catalyst was prepared in the same manner as in Catalyst Example 4, except that 0.61 g of the catalyst precursor structure B was used instead of the catalyst precursor structure A.

Catalyst Example 6

0.50 g of the catalyst precursor structure A prepared in Preparation Example 1 and 30 mL of toluene were added to a 50 mL Schlenk flask to prepare a precursor solution. 100 mL of toluene was added to a 300 mL high pressure glass reactor, 7 g of silica (Grace Davison, SP952X calcined at 650° C.) was added thereto at 40° C., and stirred for 30 min, and then allowed to stand. The solution prepared in the 50 mL flask was added to a glass reactor, warmed to 60° C., and allowed to react for 6 hrs while stirring. The reactor was cooled down to 40° C., and then stirring was stopped, followed by settling for 10 min and then decantation. After 30 mL of toluene was added to the reactor, 54 g of 10 wt % MAO was added thereto, warmed to 80° C., and allowed to react for 12 hrs while stirring. The reactor was cooled down to room temperature, and then stirring was stopped, followed by settling for 10 min and then decantation. After 30 mL of toluene was added to the reactor, warmed to 80° C., 0.25 g of the catalyst precursor structure B prepared in Preparation Example 2 was added thereto, and allowed to react for 4 hrs. The reactor was cooled down to room temperature, and then stirring was stopped, followed by settling for 10 min and then decantation. 100 mL of hexane was added into the reactor, the hexane slurry was transferred to a Schlenk flask, and the hexane solution was subjected to decantation. The resultant was dried at room temperature under reduced pressure for 3 hrs.

Catalyst Example 7

A supported catalyst was prepared in the same manner as in Catalyst Example 6, except that 0.77 g of the catalyst precursor structure A was used instead of 0.50 g, and 0.52 g of the catalyst precursor structure C was used instead of the catalyst precursor structure B.

Catalyst Example 8

A supported catalyst was prepared in the same manner as in Catalyst Example 6, except that 0.35 g of the catalyst precursor structure A was used instead of 0.50 g, and 0.24 g of the catalyst precursor structure E was used instead of the catalyst precursor structure B.

Catalyst Example 9

0.50 g of the catalyst precursor structure A prepared in Preparation Example 1 and 30 mL of toluene were added to a 50 mL Schlenk flask to prepare a precursor solution. 100 mL of toluene was added to a 300 mL high pressure glass reactor, 8 g of silica (Grace Davison, SP952X calcined at 650° C.) was added thereto at 40° C., and stirred for 30 min, and then allowed to stand. The solution prepared in the 50 mL flask was added to a glass reactor, warmed to 60° C., and allowed to react for 3 hrs while stirring. 0.25 g of the catalyst precursor structure B prepared in Preparation Example 2 was added to the reactor, and allowed to react for 5 hrs. The reactor was cooled down to 40° C., and then stirring was stopped, followed by settling for 10 min and then decantation. After 30 mL of toluene was added to the reactor, 54 g of 10 wt % MAO was added thereto, warmed to 80° C., and allowed to react for 12 hrs while stirring. The reactor was cooled down to room temperature, and then stirring was stopped, followed by settling for 10 min and then decantation. After 30 mL of toluene was added to the reactor, warmed to 80° C., 0.17 g of the catalyst precursor structure F prepared in Comparative Preparation Example 3 was added thereto, and allowed to react for 4 hrs. The reactor was cooled down to room temperature, and then stirring was stopped, followed by settling for 10 min and then decantation. 100 mL of hexane was added into the reactor, the hexane slurry was transferred to a Schlenk flask, and the hexane solution was subjected to decantation. The resultant was dried at room temperature under reduced pressure for 3 hrs.

Catalyst Example 10

A supported catalyst was prepared in the same manner as in Catalyst Example 6, except that 0.41 g of the catalyst precursor structure B was used instead of the catalyst precursor structure A, and 0.50 g of the catalyst precursor structure C was used instead of the catalyst precursor structure B.

Catalyst Comparative Example 1

A supported catalyst was prepared in the same manner as in Catalyst Example 1, except that 0.85 g of the catalyst precursor structure D prepared in Comparative Preparation Example 1 was used instead of the catalyst precursor structure A.

Catalyst Comparative Example 2

A supported catalyst was prepared in the same manner as in Catalyst Example 5, except that 0.51 g of the catalyst precursor structure E prepared in Comparative Preparation Example 1 was used instead of the catalyst precursor structure B.

Catalyst Comparative Example 3

100 mL of toluene was added to a 300 mL high pressure glass reactor, 10 g of silica (Grace Davison, SP952X calcined at 650° C.) was added thereto at 40° C., and stirred for 30 min, and then allowed to stand. 70 g of 10 wt % MAO was added thereto, warmed to 80° C., and allowed to react for 12 hrs while stirring. The reactor was cooled down to 40° C., and then stirring was stopped, followed by settling for 10 min and then decantation. 50 mL of toluene was added to the reactor and stirred for 5 min. And then stirring was stopped, followed by settling for 10 min and then decantation. After 30 mL of toluene was added to the reactor, 0.68 g of the catalyst precursor structure A prepared in Preparation Example 1 and 30 mL of toluene were added thereto. The temperature was warmed to 60° C., and allowed to react for 4 hrs while stirring. The reactor was cooled down to 40° C., and then stirring was stopped, followed by settling for 10 min and then decantation. 100 mL of hexane was added into the reactor, the hexane slurry was transferred to a Schlenk flask, and the hexane solution was subjected to decantation. The resultant was dried at room temperature under reduced pressure for 3 hrs.

Catalyst Comparative Example 4

A supported catalyst was prepared in the same manner as in Catalyst Comparative Example 3, except that 0.61 g of the catalyst precursor structure C prepared in Preparation Example 3 was used instead of the catalyst precursor structure A.

Catalyst Comparative Example 5

100 mL of toluene was added to a 300 mL high pressure glass reactor, 10 g of silica (Grace Davison, SP952X calcined at 650° C.) was added thereto at 40° C., and stirred for 30 min, and then allowed to stand. 70 g of 10 wt % MAO was added thereto, warmed to 80° C., and allowed to react for 12 hrs while stirring. The reactor was cooled down to 40° C., and then stirring was stopped, followed by settling for 10 min and then decantation. 50 mL of toluene was added to the reactor and stirred for 5 min. And then stirring was stopped, followed by settling for 10 min and then decantation. After 30 mL of toluene was added to the reactor, 0.33 g of the catalyst precursor structure A prepared in Preparation Example 1 and 30 mL of toluene were added thereto. The temperature was warmed to 60° C., and allowed to react for 2 hrs while stirring. And then, 0.45 g of the catalyst precursor structure B prepared in Preparation Example 2 and 30 mL of toluene were added to the reactor, and allowed to react for 2 hrs while stirring. The reactor was cooled down to 40° C., and then stirring was stopped, followed by settling for 10 min and then decantation. 100 mL of hexane was added into the reactor, the hexane slurry was transferred to a Schlenk flask, and the hexane solution was subjected to decantation. The resultant was dried at room temperature under reduced pressure for 3 hrs.

Example of Polyethylene Polymerization

Polymerization Examples 1 to 10 and Comparative Polymerization Examples 1 to 6: Preparation of a Polyolefin Ethylene Polymerization 2 mL of TEAL (1 M in hexane) and 70 g of 1-hexene were injected into a 2 L autoclave high pressure reactor, and 0.6 kg of hexene was added thereto, and then warmed to 85° C. while stirring at 500 rpm. And then, 30 to 45 mg of the supported catalysts (Catalyst Examples 1 to 10 and Comparative Catalyst Examples 1 to 5) and hexane were added to the reactor in vials. When the internal temperature of the reactor reached 85° C., the solution was reacted under an ethylene pressure of 30 bar for 1 hr while stirring at 500 rpm. Hydrogen was injected at a rate (0.005-0.001%) determined according to a flow rate of ethylene. After completion of the reaction, a resulting polymer was filtered to primarily remove hexane, and then dried in an oven at 80° C. for 3 hrs.

The reaction conditions and results of Polymerization Examples 1 to 10 and Comparative Polymerization Examples 1 to 6 are shown in the following Tables 1 and 2.

TABLE 1

| | Catalyst (structure) | Content of catalyst (mg) | Activity (kgPE/gCat) | Mw(*$10^4$) (g/mol) | PDI | BD(Bulk density) (g/mL) |
|---|---|---|---|---|---|---|
| Example 1 | Preparation Example 1 | 35 | 4.7 | 12.5 | 3.9 | 0.32 |
| Example 2 | Preparation Example 2 | 45 | 3.4 | 30.2 | 2.9 | 0.31 |

TABLE 1-continued

|  | Catalyst (structure) | Content of catalyst (mg) | Activity (kgPE/gCat) | Mw(*10$^4$) (g/mol) | PDI | BD(Bulk density) (g/mL) |
|---|---|---|---|---|---|---|
| Example 3 | Preparation Example 3 | 45 | 3.9 | 13.7 | 3.1 | 0.31 |
| Example 4 | Preparation Example 4 | 40 | 4.2 | 12.7 | 4.0 | 0.33 |
| Example 5 | Preparation Example 5 | 45 | 3.0 | 30.8 | 3.0 | 0.32 |
| Comparative Example 1 | Comparative Preparation Example 1 | 40 | 4.0 | 12.8 | 3.6 | 0.30 |
| Comparative Example 2 | Comparative Preparation Example 2 | 100 | 1.5 | 35.1 | 2.7 | 0.28 |
| Comparative Example 3 | Comparative Preparation Example 3 | 40 | 3.8 | 12.3 | 3.4 | 0.28 |
| Comparative Example 4 | Comparative Preparation Example 4 | 40 | 3.5 | 13.8 | 3.1 | 0.24 |

Referring to Table 1, it was confirmed that the supported hybrid metallocene catalyst prepared by first supporting the metallocene compound having pivalate, and then supporting the cocatalyst, as in Examples 1 to 5, had the catalytic activity of the same as or higher than that of Comparative Examples 1 to 4 prepared by using the metallocene compound prepared by using the metallocene compound having no pivalate or first supporting the cocatalyst.

In addition, the polyolefin prepared using the metallocene catalysts of Examples 1 to 5 is predicted to have excellent processability, because the PDI is larger than that of the polyolefin prepared using the metallocene catalysts of Comparative Examples 1 to 4, and bulk density was also improved.

TABLE 2

|  | Catalyst (structure) | Content of catalyst (mg) | Activity (kgPE/gCat) | H$_2$ feed (mol %) | MI_2.16 (g/10 mim) | MFRR (2/10) | Tm (° C.) | BD(Bulk density) (g/mL) |
|---|---|---|---|---|---|---|---|---|
| Example 6 | Preparation Example 6 | 35 | 5.2 | 0.05 | 0.72 | 10.5 | 120.0 | 0.32 |
| Example 7 | Preparation Example 7 | 30 | 6.3 | 0.03 | 0.28 | 15.2 | 120.5 | 0.31 |
| Example 8 | Preparation Example 8 | 35 | 4.8 | 0.04 | 0.40 | 13.1 | 120.1 | 0.30 |
| Example 9 | Preparation Example 9 | 35 | 5.5 | 0.04 | 0.48 | 13.9 | 120.9 | 0.32 |
| Example 10 | Preparation Example 10 | 35 | 5.0 | 0.03 | 0.65 | 11.1 | 121.1 | 0.29 |
| Comparative Example 5 | Comparative Preparation Example 3 | 40 | 4.0 | 0.01 | 1.1 | 9.5 | 119.5 | 0.29 |
| Comparative Example 6 | Comparative Preparation Example 5 | 40 | 3.9 | 0.03 | 0.76 | 10.0 | 120.6 | 0.28 |

Referring to Table 2, it was confirmed that the supported hybrid metallocene catalyst prepared by first supporting the metallocene compound having pivalate, and then supporting the cocatalyst and the metallocene compound having or not having pivalate, as in Examples 6 to 10, had the catalytic activity of the same as or higher than that of Comparative Examples 5 to 6 prepared by using the metallocene compound prepared by using the metallocene compound having no pivalate or first supporting the cocatalyst.

Moreover, the polyolefin prepared using the metallocene catalysts of Examples 6 to 10 is predicted that its processability and physical properties can be easily controlled, because it has excellent bulk density and thus can improve productivity, and the MFRR value can be finely adjusted to a desired level compared with to the polyolefin prepared using the metallocene catalysts of Comparative Examples 5 to 6.

What is claimed is:

1. A method for preparing a supported hybrid metallocene catalyst, comprising the steps of supporting at least one first metallocene compound represented by the following Chemical Formula 1 or 2 on a support; and supporting a cocatalyst on the support on which the first metallocene compound is supported:

[Chemical Formula 1]

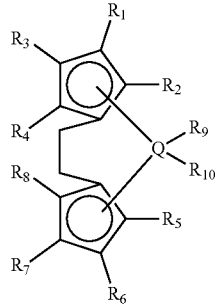

[Chemical Formula 3a]

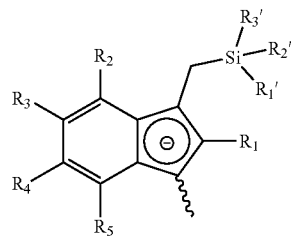

[Chemical Formula 3b]

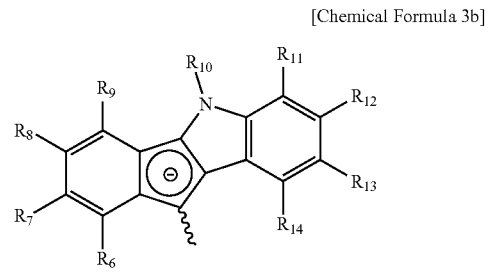

in Chemical Formula 1, $R_1$, $R_2$, $R_5$, and $R_6$ are the same as or different from each other, and are each independently hydrogen or a C1 to C20 alkyl group, $R_3$, $R_4$, $R_7$, and $R_8$ are the same as or different from each other, and are each independently hydrogen or a C1 to C20 alkyl group, or adjacent $R_3$ and $R_4$ and adjacent $R_7$ and $R_8$, respectively, are optionally connected with each other to form a substituted or unsubstituted aliphatic or aromatic ring, Q is a Group 4 transition metal, and $R_9$ and $R_{10}$ are pivalate,

[Chemical Formula 3c]

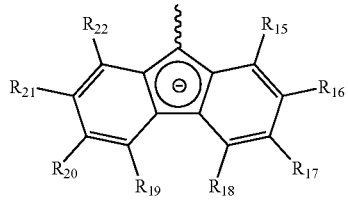

[Chemical Formula 3d]

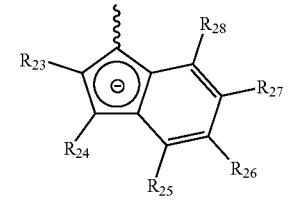

[Chemical Formula 2]

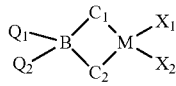

in Chemical Formula 2,

M is a Group 4 transition metal,

B is carbon, silicon, or germanium, $Q_1$ and $Q_2$ are the same as or different from each other, and are each independently hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group, $X_1$ and $X_2$ are pivalate, and $C_1$ and $C_2$ are the same as or different from each other, and are each independently represented by one of the following Chemical Formula 3a, Chemical Formula 3b, Chemical Formula 3c, or Chemical Formula 3d, provided that at least one of $C_1$ and $C_2$ is represented by Chemical Formula 3a, in Chemical Formulae 3a, 3b, 3c, and 3d, $R_1$ to $R_{28}$ are the same as or different from each other, and are each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 ether group, a C1 to C20 silylether group, a C1 to C20 alkoxy group, a C6 to C20 aryl group, a C7 to C20 alkylaryl group, or a C7 to C20 arylalkyl group, $R'_1$ to $R'_3$ are the same as or different from each other, and are each independently hydrogen, halogen, a C1 to C20 alkyl group, a C2 to C20 alkenyl group, or a C6 to C20 aryl group, and two or more neighboring groups of $R_1$ to $R_{28}$ are optionally connected with each other to form a substituted or unsubstituted aliphatic or aromatic ring.

2. The method of claim 1, further comprising a step of supporting a second metallocene compound on the support on which the cocatalyst is supported, wherein the second metallocene compound is represented by the same Chemical Formula 1 or 2 of claim 1 except $R_9$, $R_{10}$, $X_1$ and $X_2$ are each independently pivalate, halogen, or a C1 to C20 alkyl group.

3. The method of claim 1, wherein the first metallocene compound is selected from the group consisting of the following structural formulae:

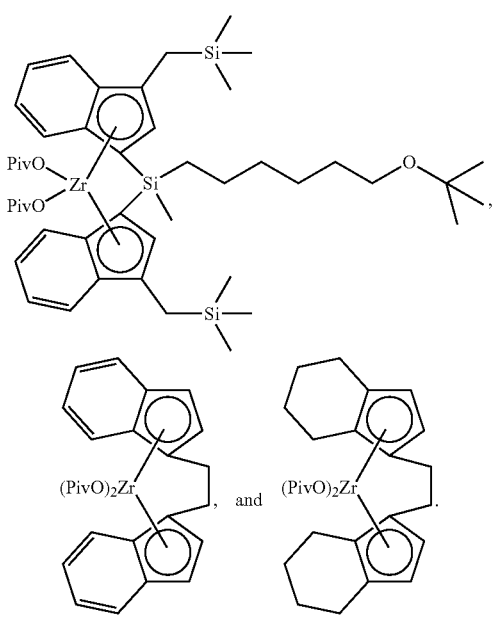

4. The method of claim 2, wherein the second metallocene compound is selected from the group consisting of the following structural formulae:

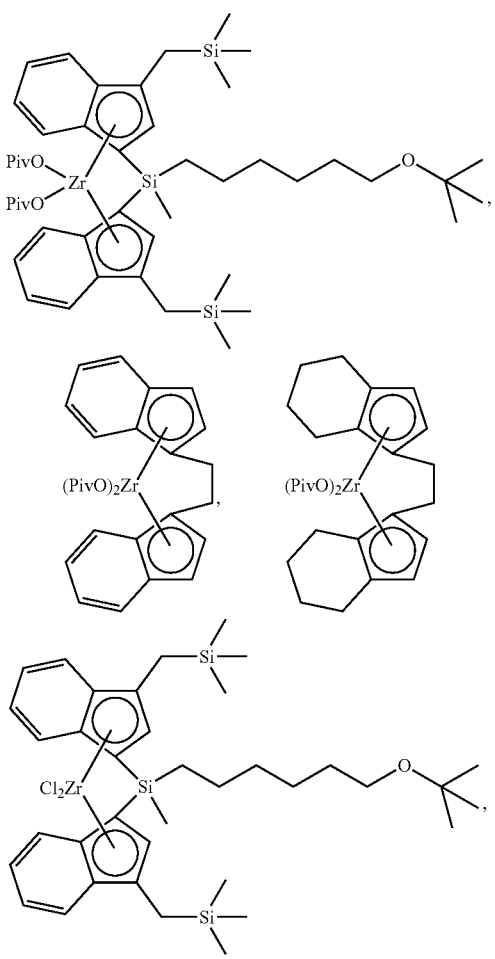

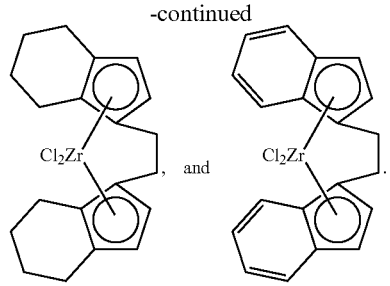

5. The method of claim 2, wherein the first metallocene compound and the second metallocene compound are supported at a weight ratio of 1:99 to 99:1.

6. The method of claim 1, wherein the cocatalyst comprises one or more selected from the group of compounds represented by the following Chemical Formula 4, Chemical Formula 5, and Chemical Formula 6:

$$—[Al(R_{29})—O]_n—$$ [Chemical Formula 4]

in Chemical Formula 4,

R$_{29}$ are the same as or different from each other, and each independently halogen; C1 to C20 hydrocarbon; or halogen-substituted C1 to C20 hydrocarbon; and $$J(R_{30})_3$$ [Chemical Formula 5]

in Chemical Formula 5,

R$_{30}$ are the same as R$_{29}$ defined in Chemical Formula 4; and

J is aluminum or boron;

$$[E-H]^+[ZA'_4]^- \text{ or } [E]^+[ZA'_4]^-$$ [Chemical Formula 6]

in Chemical Formula 6,

E is a neutral or cationic Lewis acid;

H is a hydrogen atom;

Z is a Group 13 element; and

A' are the same as or different from each other, and each independently a C6 to C20 aryl group or a C1 to C20 alkyl group, of which one or more hydrogen atoms are unsubstituted or substituted with halogen, C1 to C20 hydrocarbon, alkoxy, or phenoxy.

7. The method of claim 1, wherein the cocatalyst comprises one or more compounds selected from the group consisting of methyl aluminoxane(MAO), ethyl aluminoxane, isobutyl aluminoxane, and butyl aluminoxane.

8. The method of claim 1, wherein the support comprises one or more selected from the group consisting of silica, silica-alumina, and silica-magnesia.

9. The method of claim 1, wherein the support is previously dried at 200 to 1000° C.

10. The method of claim 2, wherein the first and second metallocene compound are each supported in an amount of 0.1 to 20 parts by weight based on 100 parts by weight of the support.

11. The method of claim 1, wherein the cocatalyst is supported in an amount of 1 to 1,000 parts by weight based on 100 parts by weight of the support.

12. A supported hybrid metallocene catalyst prepared by the method according to claim 1.

13. A method for preparing a polyolefin, comprising the step of polymerizing olinic monomers in the presence of the supported hybrid metallocene catalyst of claim 12.

* * * * *